G. A. BADER.
EYEGLASS MOUNTING.
APPLICATION FILED MAR. 21, 1910.
989,551.
Patented Apr. 18, 1911.
Fig. 1.
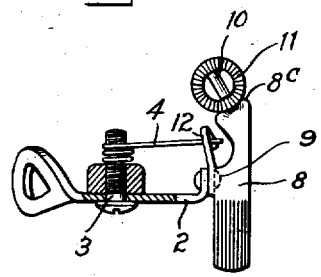
Fig. 2.
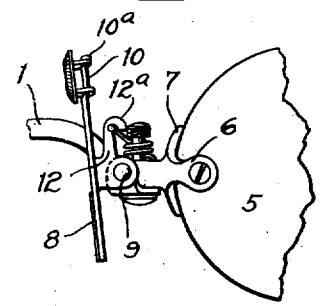
Fig. 3.
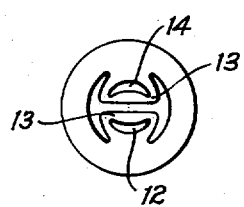
Fig. 4.
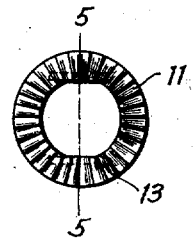
Fig. 5.
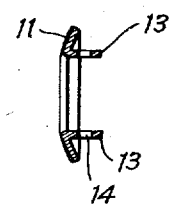
Fig. 6.
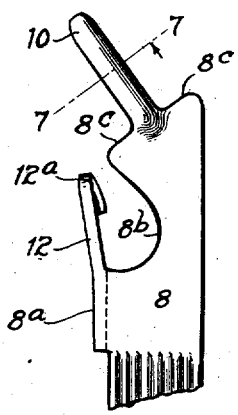
Fig. 7.
Fig. 8.
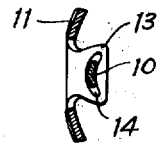
Fig. 9.
WITNESSES:
C. W. Carroll
L. Thon
INVENTOR:
Gustav A. Bader
by Osgood Davis Dorr
his attorneys

UNITED STATES PATENT OFFICE.

GUSTAV A. BADER, OF ROCHESTER, NEW YORK.

EYEGLASS-MOUNTING.

989,551. Specification of Letters Patent. Patented Apr. 18, 1911.

Application filed March 21, 1910. Serial No. 550,748.

*To all whom it may concern:*

Be it known that I, GUSTAV A. BADER, a citizen of the United States, and resident of Rochester, in the county of Monroe and State of New York, have invented certain new and useful Improvements in Eyeglass-Mountings, of which the following is a specification.

This invention relates to eye glass mountings, and particularly to nose clamps, and its object is to produce a nose clamp that will adjust itself readily to the nose and can not be easily displaced.

In the drawings:—Figure 1 is a vertical section of a portion of an eye-glass mounting embodying the present invention, including the nose clamp, the nose-clamp lever and the pivotal mounting of the latter; Fig. 2 is a rear elevation of one half of an eye glass mounting equipped with the nose-clamp of Fig. 1; Fig. 3 shows the blank from which the adjustable nose-pad of the clamp is formed; Figs. 4 and 5 show the nose-pad completed, the latter being a section on the line 5—5 of Fig. 4; Fig. 6 is an enlarged elevation of the nose guard which carries the adjustable pad, and which with it constitute the clamp; Fig. 7 is a section on the line 7—7 of Fig. 6; Fig. 8 is a section on the same line, but showing the adjustable pad in place; and Fig. 9 is a section similar to Fig. 8, but showing the pad in two different positions.

The invention relates specifically to nose clamps. These are shown in connection with a rigid bridge 1, a nose-clamp lever 2, a screw 3 whereby the lever is pivoted to the body of the mounting, a spring 4 on the screw for holding the lever inwardly, a lens 5, lens clips 6, 6, and lens straps 7, 7, but these parts serve merely to explain the position and operation of the novel nose clamps.

The nose clamp comprises a nose guard 8 which is a plate of metal or other suitable material (see Figs. 1 and 6) that has a surface shaped to fit the side of the nose. Preferably a part of this surface is corrugated, as shown in the drawings, and perferably also the plate 8 is widest at its lower end below the point 9 where it is pivoted to the lever 2, where it engages the broadest part of the nose. Above its pivot 9 the plate is preferably reduced in width by carrying its outer edge $8^a$ upwardly and inwardly in a curve $8^b$, while an integral part 10 that is designed to serve as a support for the pad 11 projects forwardly beyond the plate, at an angle that is approximately forty-five degrees to a longitudinal, median line through the guard. An arm 12 at the outer edge of the guard 8 extends upwardly beyond the pivot 9, and receives the end of one of the springs 4, so that these springs normally tilt the guards inwardly toward each other in addition to swinging the guard-carrying levers 2, 2 inwardly toward each other. The drawings represent a guard complete in these details that is made from a single blank, in which both the support 10 and the arm 12 are integral with the guard proper. The upper end $12^a$ of the arm is shown bent over into a hook to retain in place the end of the spring 4.

The pad 11 is made from the disk-shaped blank that is shown in Fig. 3. Ears 13, 13 that serve as bearings to receive the support 10 are formed by a punching operation, and in each of these ears a curved slot 14 is punched, the slots in the two ears being similarly curved in opposite directions, so that when the ears are bent out at right angles to the face of the pad as in Figs. 4 and 5 the slots will coincide. The blank is converted into the pad 11 by bending the ears 13, 13 out at right angles, as aforesaid, and pressing the body of the pad to a concavo-convex form.

The pad support 10 is convex on the side toward the nose (see Fig. 7), with a curvature that corresponds with that of the slots 14, 14 in the ears 13, 13 of the pad, and it is narrower than the slots are long, so that the pad has a sliding movement on its support, and also rocks back and forth as it slides, thus tilting alternately back and forth those parts of the engaging surface of the pad that lie alongside the support 10 (see Figs. 8 and 9). This rocking, sliding movement of the pad upon its support 10 not only makes possible a nice adjustment of the pad, but causes the pad to cling tightly to the face of the wearer of the eyeglasses, when facial movement causes the pad to turn upon its support, for as it turns under a movement of flesh and muscles that tends to displace it, it also slides on its support, so that the fulcrum retains the same relative position to the surface that is in engagement with the face as before. Furthermore, as the pad slides in either direction away from its central position the leverage increases between the fulcrum and that part of the bearing-surface on which the pressure comes, so that the pad is made to grip more firmly when disturbed than normally. Again, the oblique forward extension of the pad-support 10 from the nose guard at the angle, or approximately the angle, represented, gives a rigid resistance to the movement of the nose guard under normal conditions.

The pad 11 may be corrugated on its engaging surface as represented, and is held in place on its support 11 by the shoulders 8$^c$, 8$^c$ on the guard 8, and the overturned end 10$^a$ of the support 10 (see Fig. 2).

What I claim is:—

1. In eye-glass mountings, the combination of a nose-guard provided with a pivotal support that projects obliquely forward, and a nose-pad pivoted upon said support; substantially as shown and described.

2. In eye-glass mountings, the combination of a nose-guard provided with a pivotal support that projects obliquely forward, and a convex nose-pad rotative upon said support; substantially as shown and described.

3. In eye-glass mountings, the combination of a nose-guard provided with a pivotal support, and a nose-pad mounted upon said support, the nose-pad having openings engaging the support and substantially longer than the width of the support, so that the nose-pad has both a rocking and a sidewise sliding movement upon said support; substantially as shown and described.

4. In eye-glass mountings, the combination of a nose-guard having a surface adapted to engage the side of the nose and having also a nose-pad support provided with opposite concentric bearing-surfaces of arcuate form, and a nose-pad mounted upon said support, the nose-pad having arc-shaped openings closely embracing the support at said bearing-surfaces but of greater length than the width of the support so as to permit the pad to slide upon the support with an arcuate movement; substantially as shown and described.

5. In eye-glass mountings, the combination of a nose-guard provided with a support that projects obliquely forward, and a nose-pad mounted upon said support, the nose-pad having openings engaging the support and substantially longer than the width of the support, so that the nose-pad has both a rocking and a sidewise sliding movement upon said support; substantially as shown and described.

6. A nose guard consisting of a plate having an oblique, forwardly-extending concavo-convex pad support integral therewith, and a pad movably mounted on said support; substantially as shown and described.

7. A nose guard consisting of a plate provided with pivotal supporting means and having a wide bearing surface below said means, a narrow portion above said means terminating in shoulders, and an oblique, forwardly-extending pad support at its upper end; substantially as shown and described.

8. The combination with a nose pad consisting of a plate having rearwardly extending parallel ears, each with a curved slot, of a support for the pad adapted to enter said slot and of less width than the length of said slots, whereby said pad both rocks and slides upon said support; substantially as shown and described.

9. The combination with a nose pad whose engaging surface is convex, and which has rearwardly extending ears with curved parallel slots, of a support for the pad adapted to enter said slots, and of less breadth than the length of said slots, whereby said pad both rocks and slides upon said support, changing the location of its fulcrum; substantially as shown and described.

GUSTAV A. BADER.

Witnesses:
D. GURNEE,
L. THON.